US011124119B2

(12) United States Patent
Beecher et al.

(10) Patent No.: US 11,124,119 B2
(45) Date of Patent: Sep. 21, 2021

(54) REARVIEW ACTUATION MECHANISM AND REARVIEW DEVICE USING SAME

(71) Applicant: Motherson Innovations Company Limited, London (GB)

(72) Inventors: Stephen Beecher, London (GB); David Kershaw, London (GB); Gareth Aspden, London (GB); Levente Kurti, London (GB); Dong Myeong Park, London (GB); Andreas Herrmann, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/429,982

(22) Filed: Jun. 3, 2019

(65) Prior Publication Data

US 2019/0366931 A1    Dec. 5, 2019

(30) Foreign Application Priority Data

Jun. 4, 2018 (DE) ...................... 10 2018 113 246.8
Mar. 1, 2019 (DE) ...................... 10 2019 105 294.7

(51) Int. Cl.
*A47F 1/14* (2006.01)
*B60R 1/072* (2006.01)
*B60R 1/12* (2006.01)

(52) U.S. Cl.
CPC ............... *B60R 1/072* (2013.01); *B60R 1/12* (2013.01); *B60R 2001/1215* (2013.01); *B60R 2001/1253* (2013.01)

(58) Field of Classification Search
CPC .............................. G02B 7/1827; B60R 1/025
See application file for complete search history.

(56) References Cited

U.S. PATENT DOCUMENTS

| 4,609,265 A * | 9/1986 | McKee ................ G02B 7/1827 |
| | | 307/9.1 |
| 4,925,289 A | 5/1990 | Cleghorn et al. |
| 9,956,916 B2 * | 5/2018 | Dalton ................... B60R 1/072 |

OTHER PUBLICATIONS

Office Action dated Nov. 18, 2019 of GB application No. 1907562.1.

* cited by examiner

*Primary Examiner* — Amy J. Sterling
(74) *Attorney, Agent, or Firm* — Jones Day

(57) ABSTRACT

An actuator mechanism for a rearview device includes a cam surface which is positioned on or is part of a rearview element or rearview element mount of the rearview device, a cam lever configured to move on the cam surface, an actuator configured to rotate the cam lever, where rotating the cam lever in one direction causes the rearview element or rearview element mount to move in one manner, and rotating the cam lever in an opposite direction causes the rearview element or rearview element mount to a move in a different manner. A rearview device and a motor vehicle may include the actuator mechanism.

11 Claims, 12 Drawing Sheets

REARVIEW ACTUATION MECHANISM AND REARVIEW DEVICE USING SAME

CROSS-REFERENCE TO RELATED APPLICATIONS

This application claims the benefit of foreign priority to German Patent Application No. DE 10 2019 105 294.7, filed Mar. 1, 2019, and German Patent Application No. DE 10 2018 113 246.8, filed Jun. 4, 2018, each of which is hereby incorporated by reference in its entirety for all purposes.

BACKGROUND OF THE INVENTION

1. Field of the Invention

The following description relates to a rearview actuation mechanism having a cam system with one or more cams and one or more actuators for interacting with the one or more cams, and a rearview device using same.

2. Description of Related Art

Actuation mechanisms for rearview devices are typically powered by gears and motors which may cause rearview devices to be heavy and loud during operation.

US Patent Application Publication No. 2017/0023111 describes an actuator device having at least one retaining means on which rearview means can be secured or is secured and which are mounted in a movable manner relative to a housing component of a rearview device and including at least one adjusting unit with at least one second adjusting means for moving the retaining means relative to the housing component. The first adjusting means and the second adjusting means each including at least one shape-memory element, and the first adjusting unit and the second adjusting unit are arranged between the housing component and the retaining means so as to be mechanically connected in series. The first adjusting unit has a first maximum travel path, and the second adjusting unit has a second maximum travel path which is different from the first maximum travel path.

US Patent Application Publication No. 2017/0190289 describes an adjustment assembly for adjusting the reflecting surface of a glass assembly in an external rearview vehicle mirror, where two linear adjusting motors act on two points of the glass assembly, where the adjusting motors are positioned between the glass assembly and a mirror carrier in the mirror head. The adjusting motors are connected to the glass assembly and/or the mirror carrier via at least one elastomeric connecting piece.

U.S. Pat. No. 4,576,449 describes a frame carrying a plurality of piezoelectric elements operatively arranged between the frame and the mirror so that expansions and contractions of these piezoelectric elements will pivot the mirror back and forth about the pivot elements as indicated by the double arrow (see FIG. 2 of the '449 patent). A gyro operatively mounted in the housing of the sighting system provides first and second electrical control signals for the rough and fine adjustment of the mirror system.

U.S. Pat. No. 8,622,559 describes gear knees attached to first ends of two perpendicular arms by means of a ball and socket joint in such a way that the actuating force coming from the gear knees is applied on first ends of perpendicular arms, each arm pivoting independently about the central point where they cross. The arms are attached directly to the mirror thus moving the arms causes movement of the mirror element.

U.S. Pat. No. 4,678,295 describes a mirror arrangement where protruding outwardly from the base member are linear potentiometers, each comprising a shaft portion and sphere portion (see FIGS. 2 and 6 of the '295 patent). The spheres are received within potentiometer receiving sockets protruding from the mirror case. The sphere must be forceably inserted into the receiving socket. This sphere-socket connection causes potentiometer shaft to reciprocate within a housing as a result of the pivotal movement of the mirror case about the base member.

U.S. Pat. No. 9,108,573 describes an adjustment device for a carrier plate which can be pivoted about two mutually orthogonal axes and is configured to receive a motor vehicle mirror, includes one motor per axis for moving a non-rotatably and non-tiltably guided linear drive, which is in engagement via a socket with a joint ball on the carrier plate, and a funnel-shaped hub provided with a hollow shaft.

SUMMARY OF THE INVENTION

In an aspect, an actuator mechanism for a rearview device, the actuator mechanism includes a first cam surface which is positioned on or is part of a rearview element or rearview element mount of the rearview device, a first cam lever configured to move on the first cam surface, a first actuator configured to rotate the first cam lever, where rotating the first cam lever in one direction causes the rearview element or rearview element mount to move in one manner, and rotating the first cam lever in an opposite direction causes the rearview element or rearview element mount to a move in a different manner.

The actuator mechanism may further include a second cam surface which is positioned on or is part of the rearview element or rearview element mount, a second cam lever configured to move on the second cam surface, a second actuator configured to rotate the second cam lever, where rotating the second cam lever in one direction causes the rearview element or rearview element mount to move in one manner, and rotating the second cam lever in an opposite direction causes the rearview element or rearview element mount to a move in a different manner.

The first cam surface may be curved and may include a first cam surface highest point and a first cam surface lowest point, and the second cam surface may be curved and may include a second cam surface highest point and a second cam surface lowest point.

The first cam lever may include a first contact follower which moves on the first cam surface, and the second cam lever may include a second contact follower which moved on the second cam surface.

In response to the first contact follower being moved to a central position on the first cam surface and the second contact follower being moved to a central position on the second cam surface, the rearview element or rearview element mount may be in a neutral position.

In response to the first contact follower being moved to the first cam surface lowest point and the second contact follower being moved to the second cam surface highest point, the rearview element or rearview element mount may be angled fully away from a user.

In response to the first contact follower being moved to the first cam surface highest point and the second contact follower being moved to the second cam surface lowest point, the rearview element or rearview element mount may be angled fully towards a user.

In response to the first contact follower being moved to the first cam surface highest point and the second contact follower being moved to the second cam surface highest point, the rearview element or rearview element mount may be angled fully upwards along a vertical axis.

In response to the first contact follower being moved to the first cam surface lowest point and the second contact follower being moved to the second cam surface lowest point, the rearview element or rearview element mount may be angled fully downwards along a vertical axis.

The first actuator may include at least one of a piezoelectric actuator, one or more shape memory alloy springs, and a DC motor.

The first actuator and the second actuator may each include at least one of a piezoelectric actuator, one or more shape memory alloy springs, and a DC motor.

The first actuator and the second actuator may each include a pair of shape memory alloy springs, where movement of one of the pair of shape memory alloy springs in one direction may cause movement of the other of the pair of shape memory alloy springs in an opposite direction.

The first actuator and the second actuator may each include a motor, a gear which is rotated by the motor, and a gear actuator connected to the gear.

In another aspect, a rearview device includes an actuation mechanism as described above, a case frame, and a reflective element attached to the rearview element or rearview element mount and configured to provide a rear or side view to a user.

The rearview device may further include a center pivot which attaches the rearview element or rearview element mount to the case frame so that the rearview element or rearview element mount and the attached reflective element may pivot with respect to the case frame.

In yet another aspect, a motor vehicle may include the rearview device as described above.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, certain embodiments of the present disclosure are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present invention and, together with the description, serve to explain advantages and principles consistent with the invention.

DETAILED DESCRIPTION OF THE INVENTION

Figure 1:
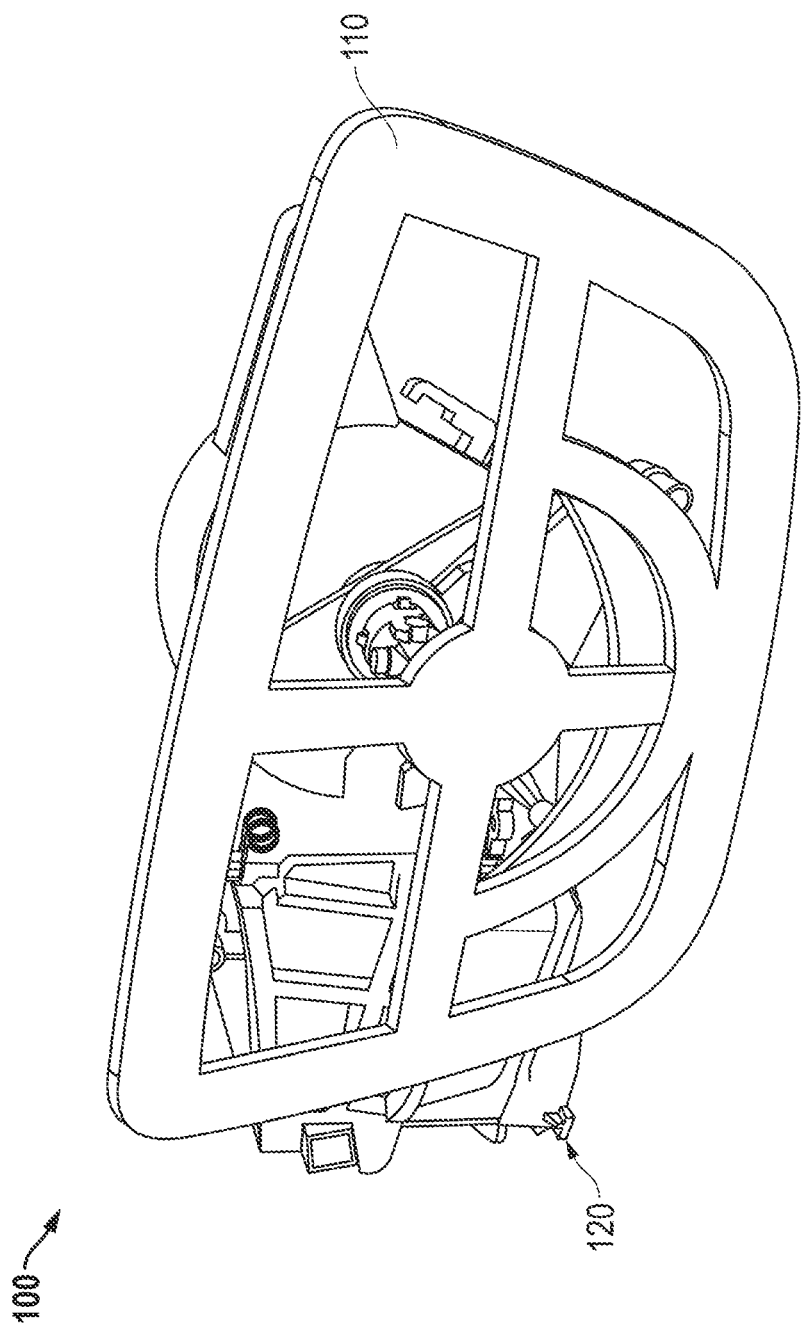
FIG. 1 is a diagram illustrating a perspective view of an example of a rearview device including a rearview actuation mechanism.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiments incorporating aspects of the present inventions will require numerous implementation specific decisions to achieve the inventors' ultimate goal for the commercial embodiment. While these efforts can be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," and "surface" are used in the description for clarity in specific reference to the Figures and are not intended to limit the scope of the invention or the appended claims. Further, it should be understood that any one of the features of the invention can be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

FIG. 1 is a diagram illustrating a perspective view of an example of a rearview device including a rearview actuation mechanism.

Referring to FIG. 1, a rearview device 100 includes a case frame 120 and a rearview element or rearview element mount 110 including a mirror (not shown), display (not shown), or camera (not shown), or a mount for carrying a mirror (not shown), display (not shown), or camera (not shown) which provides a user a rear or side view of a vehicle. Throughout the specification, the rearview element or rearview element mount 110 is illustrated as a rearview mount for mounting a mirror or a display but is not limited to being a plate for mounting a mirror or display; for example, the rearview element or rearview element mount 110 includes the rearview element itself such as a mirror, a camera, a display, or other rearview element which is capable of capturing or displaying a rearview image, or a rearview element mount such as a plate for a mirror, a plate for holding a display which provides a rearview image, a mount or plate for holding a camera, or any other type of mount for holding a rearview element which is capable of capturing or displaying a rearview image.

Figure 2:
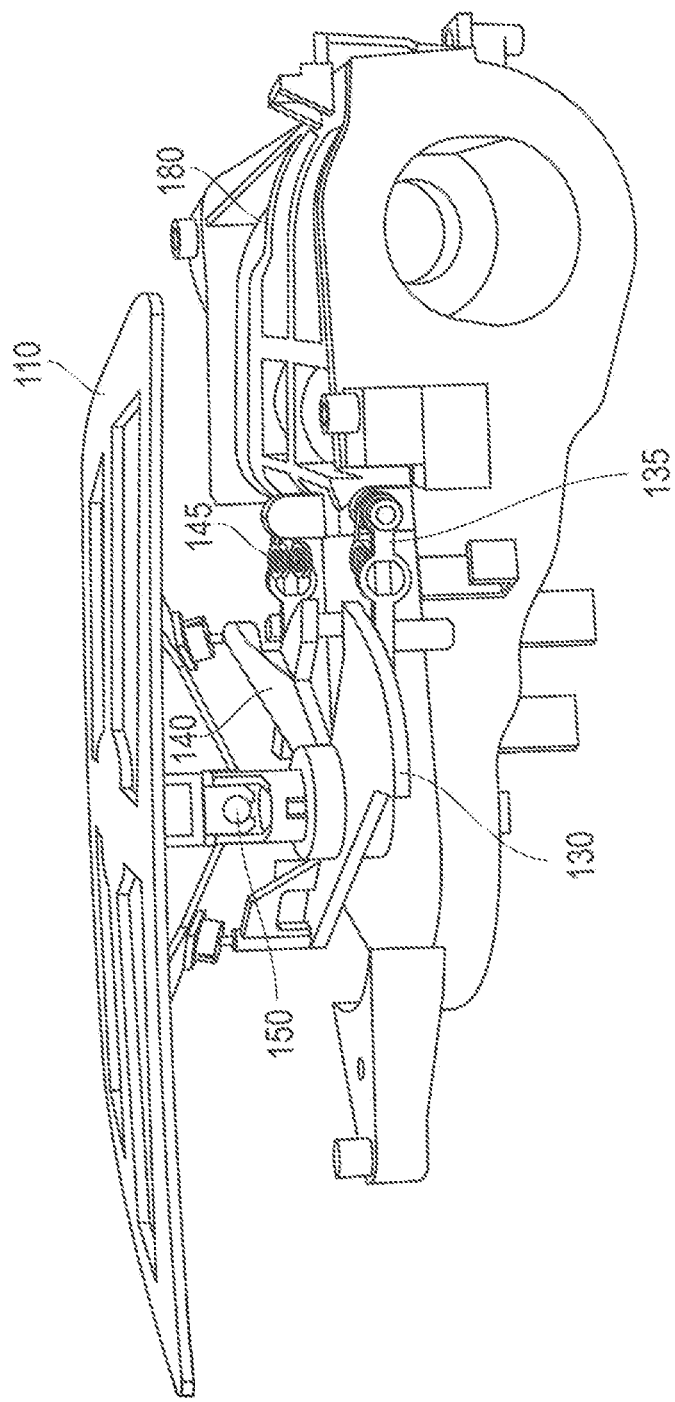
FIG. 2 is a diagram illustrating a side view of the rearview device including the rearview actuation mechanism.

FIG. 2 is a diagram illustrating a side view of the rearview device including the rearview actuation mechanism.

Referring to FIG. 2, the rearview element or rearview element mount 110 is mounted to the case frame 120 by a center pivot 150 which allows the rearview element or rearview element mount 110 to pivot upwards, downwards, left and right with respect to the case frame 120 as desired while remaining secured to the case frame 120. The actuation mechanism includes a first cam lever 130 and a corresponding first actuator 135 for rotating the first cam lever 130, and a second cam lever 140 and a corresponding second actuator 145 for rotating the second cam lever 140.

The actuators 135, 145 are mounted on the case frame 120 and move the cam levers 130, 140. In this example, the actuators 135, 145 are piezo systems; however, this can be substituted by DC electric motors or shape memory alloys as described in more detail below with reference to FIG. 11, among other actuation mechanisms known to those of ordinary skill in the art. Each cam lever 130, 140 is secured to the case frame 120 at the center pivot axis and allowed to rotate around this central pivot axis. This is best illustrated in reference with FIG. 4. Due to the stiffness in design and the properties of the material used for the cam levers 130, 140, and/or by support from the design of the case frame, in a preferred embodiment, the levers 130, 140 are restricted from lateral movement in plane. This is to ensure constant contact is maintained between the lever 130, 140 and the actuators 135, 145.

Figure 3:
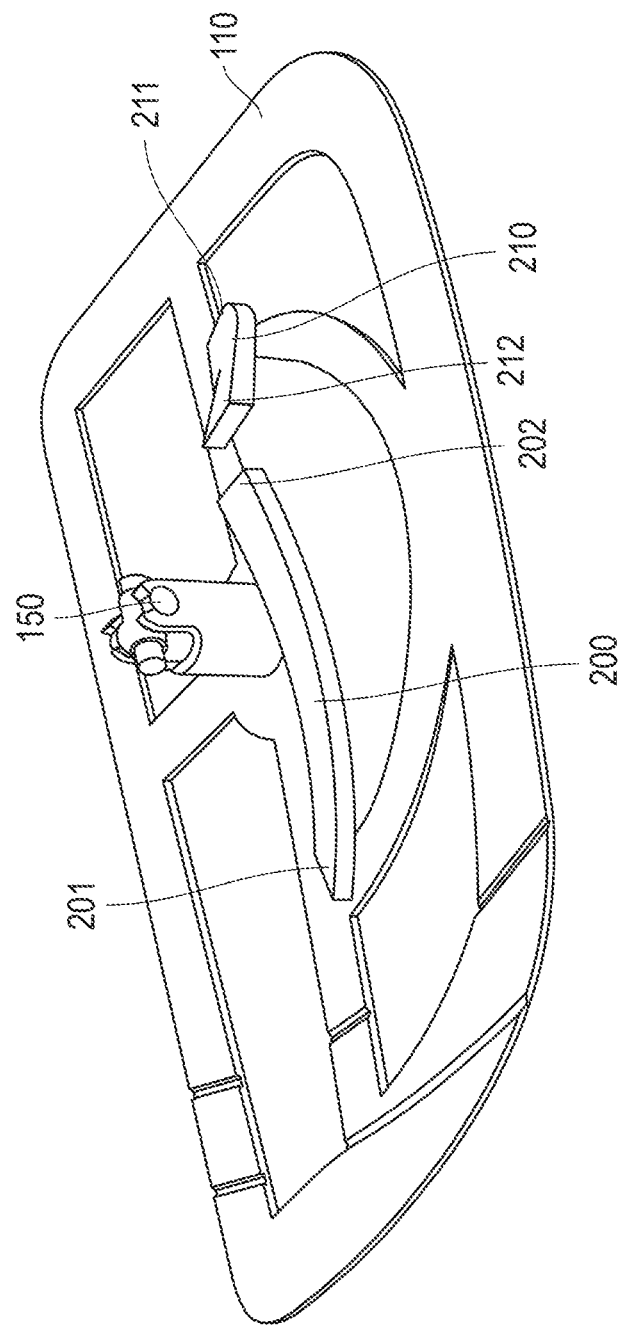
FIG. 3 is a diagram illustrating a top perspective view of a rearview element or rearview element mount with cam surfaces of the rearview device.

FIG. 3 is a diagram illustrating a top perspective view of a rearview element or rearview element mount with cam surfaces of the rearview device.

Referring to FIG. 3, the center pivot 150 is illustrated which is secured to the case frame 120 of the rearview device 100 for allowing the rearview element or rearview element mount 110 to pivot with respect to the case frame 120. The rearview element or rearview element mount 110 includes a first cam surface 200 and a second cam surface 210 on its underside, i.e. the side opposite to the side where a mirror or display can be mounted. In this example, two cam surfaces 200, 210 are illustrated but in other examples a single cam surface may be used or more than two cam surfaces. The first cam surface 200 includes a highest point 202 of the first cam surface 200 and a lowest point 201 of the first cam surface 200. Similarly, the second cam surface 210 includes a highest point 212 of the second cam surface 210 and a lowest point 211 of the second cam surface 210.

Figure 4:
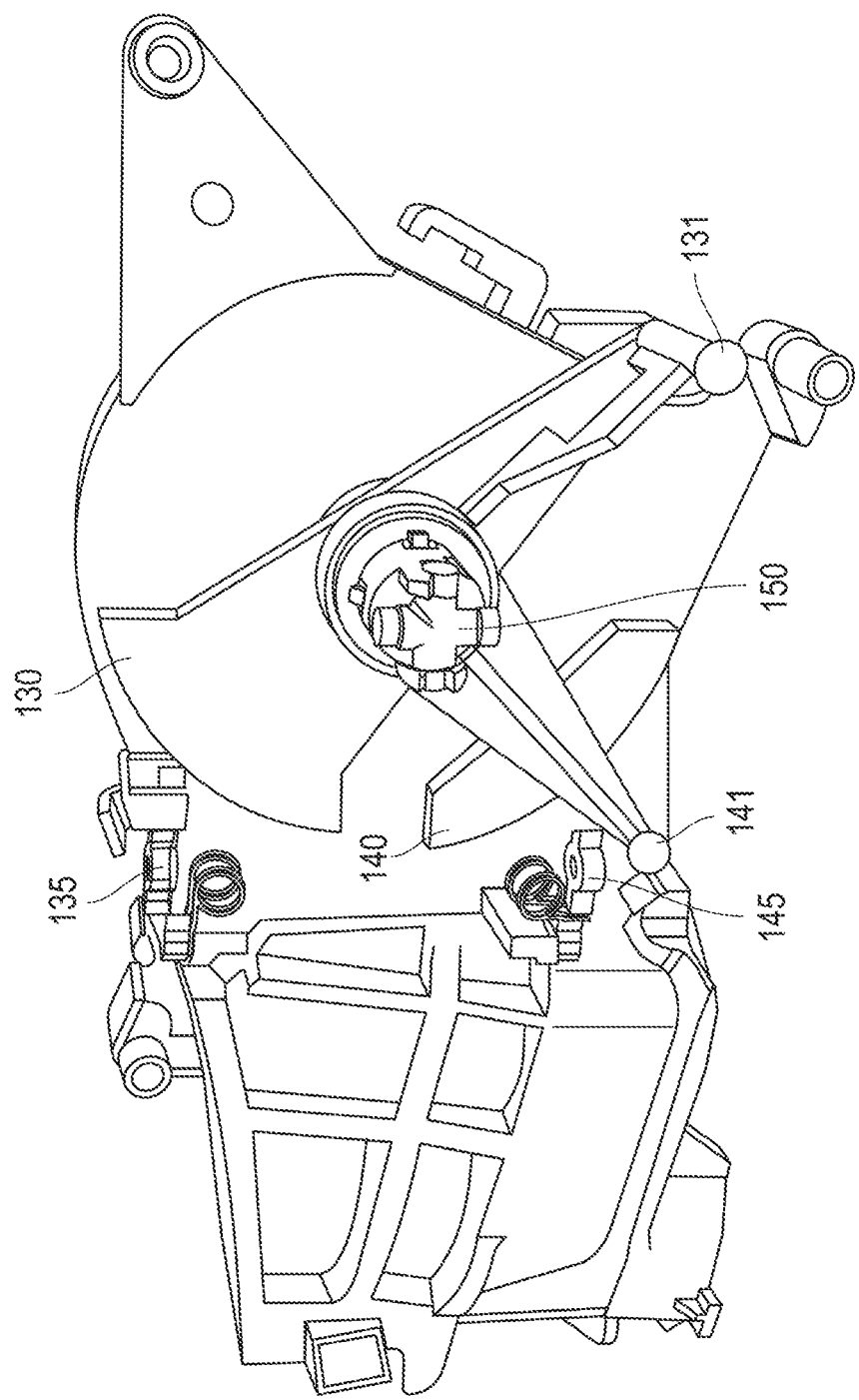
FIG. 4 is a diagram illustrating a top view of the rearview device with the rearview element or rearview element mount removed and showing the cam levers and cam actuators.

FIG. 4 is a diagram illustrating a top view of the rearview device with rearview element or rearview element mount removed and showing the cam levers and cam actuators.

Referring to FIG. 4, the center pivot 150 is illustrated, to which the rearview element or rearview element mount 110 is secured to pivot with respect to the case frame 120, as described above in reference with FIG. 3. Further, a clearer illustration of the first cam lever 130, the first actuator 135, the second cam lever 140, and the second actuator 145 is provided because the rearview element or rearview element mount 110 is removed. At the top ends of the cam levers 130, 140 are contact follower receiving portions 131, 141 for attaching to cam contact followers 132, 142 which are illustrated and described in more detail below in reference with FIG. 5.

Figure 5:
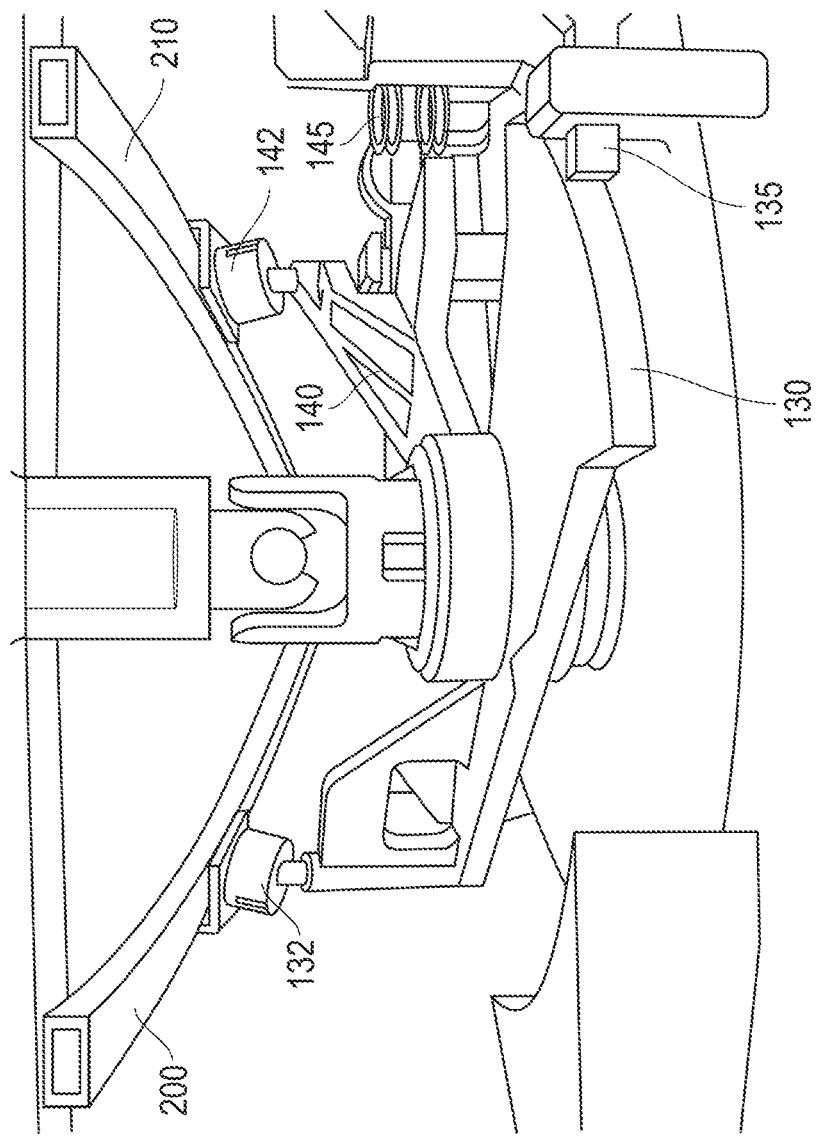
FIG. 5 is a diagram illustrating the interface of the cam levers of the actuation mechanism with the cam surfaces of the rearview element or rearview element mount.

FIG. 5 is a diagram illustrating the interface of the cam levers of the actuation mechanism with the cam surfaces of the rearview element or rearview element mount.

Referring to FIG. 5, the contact follower receiving portions 131, 141 receive cam contact followers 132, 142 which follow the cam surfaces 200, 210. Integrated within the end of each cam lever 130, 140 is a contact follower 132, 142. These interfaces follow the profile of the cam surfaces 200, 210 of the rearview element or rearview element mount 110, converting rotational movement of the two cam levers 130, 140 into a corresponding angular movement of the rearview element or rearview element mount 110. This is achieved by the contact followers 132, 142 driving the rearview element or rearview element mount 110 via the movement along the cam surfaces 200, 210 profiles around a center pivot mechanism 150 between the case frame 120 and the rearview element or rearview element mount 110.

Figure 6:
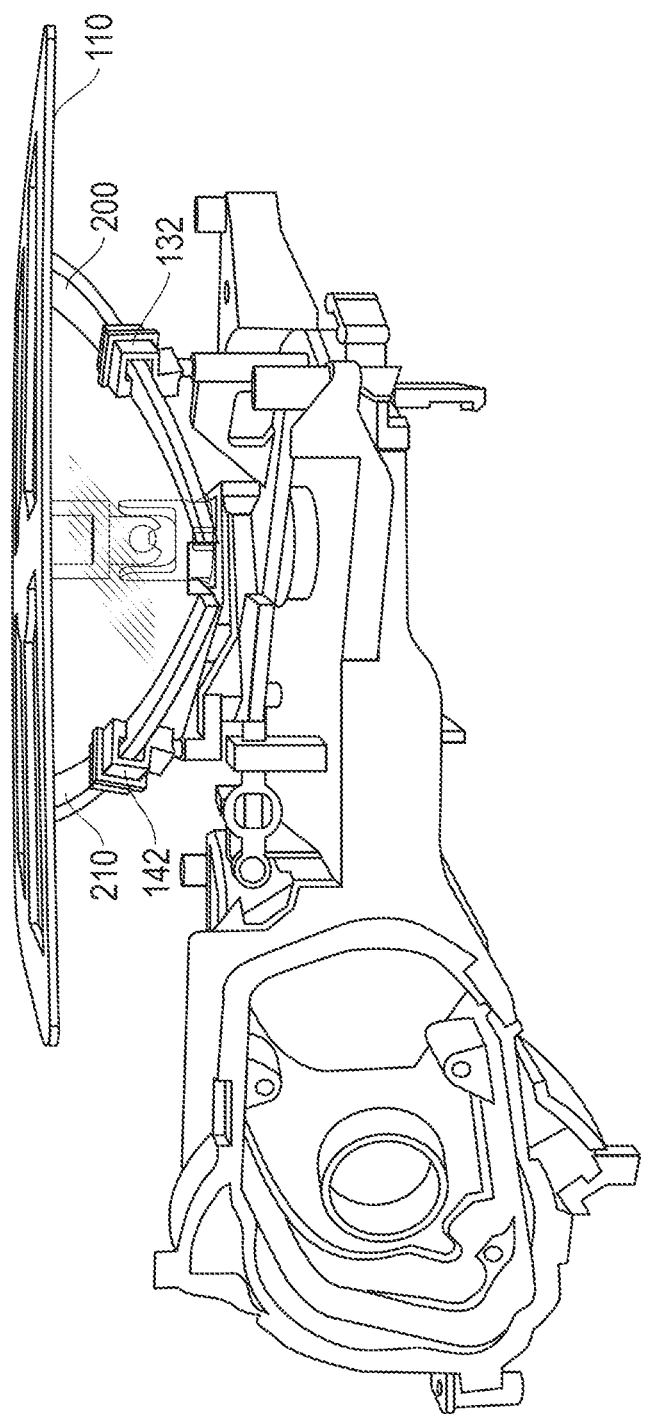
FIG. 6 is a diagram illustrating the rearview element or rearview element mount in a neutral position.
Figure 7:
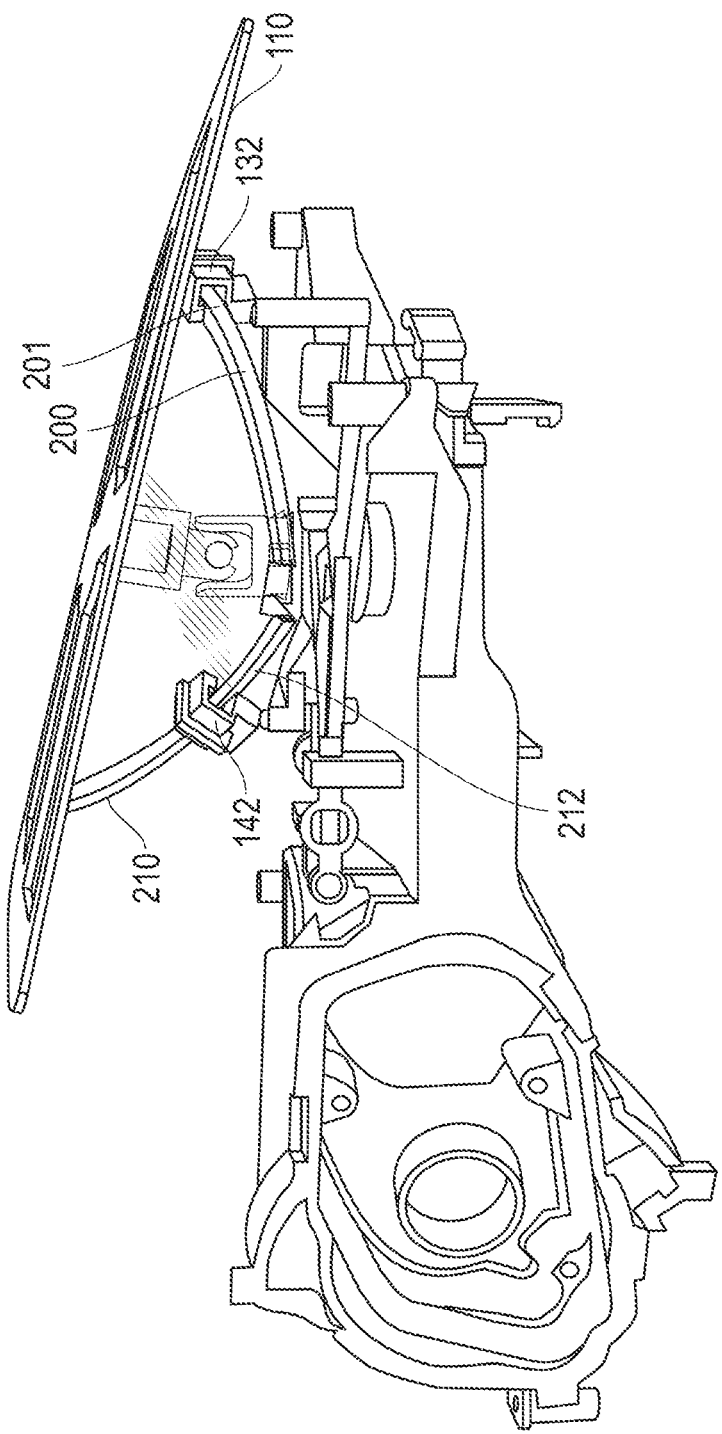
FIG. 7 is a diagram illustrating the rearview element or rearview element mount angled fully away from a user.
Figure 8:
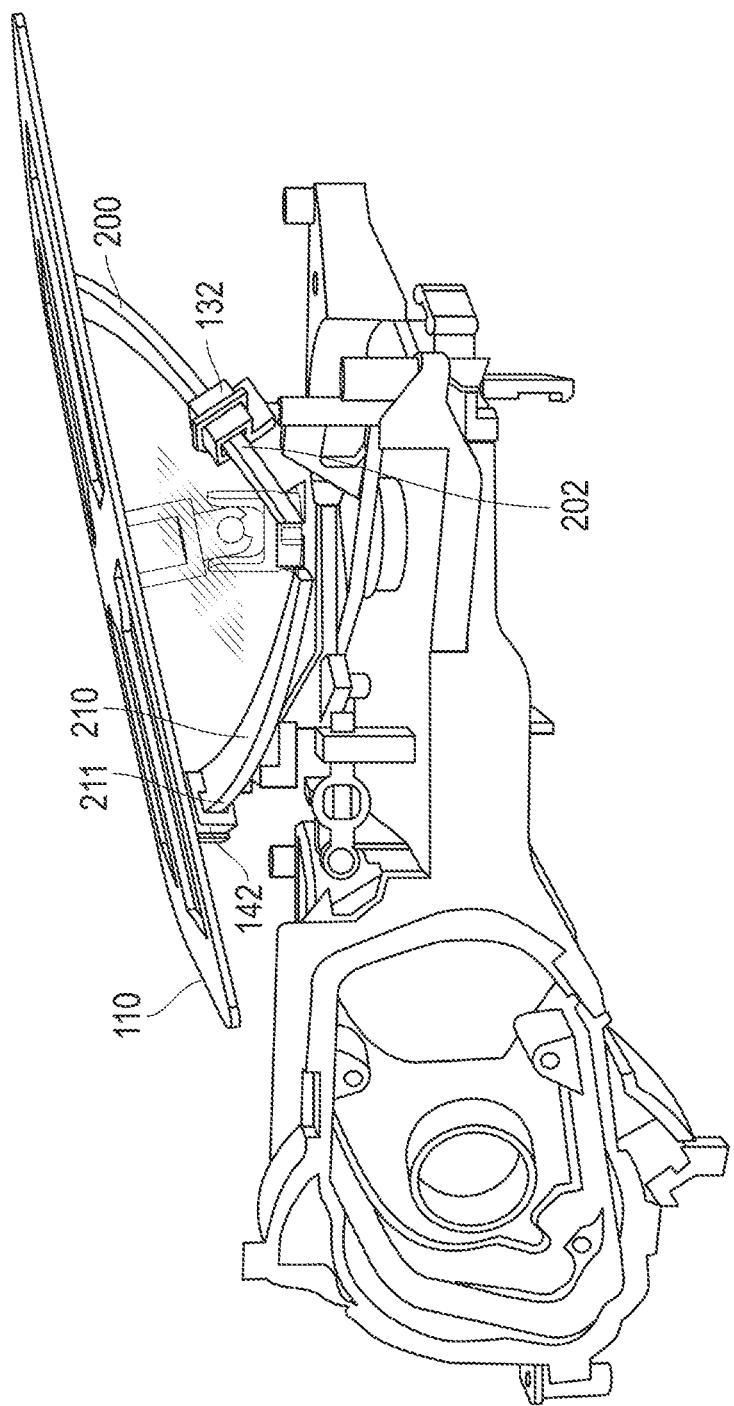
FIG. 8 is a diagram illustrating the rearview element or rearview element mount angled fully towards the user.
Figure 9:
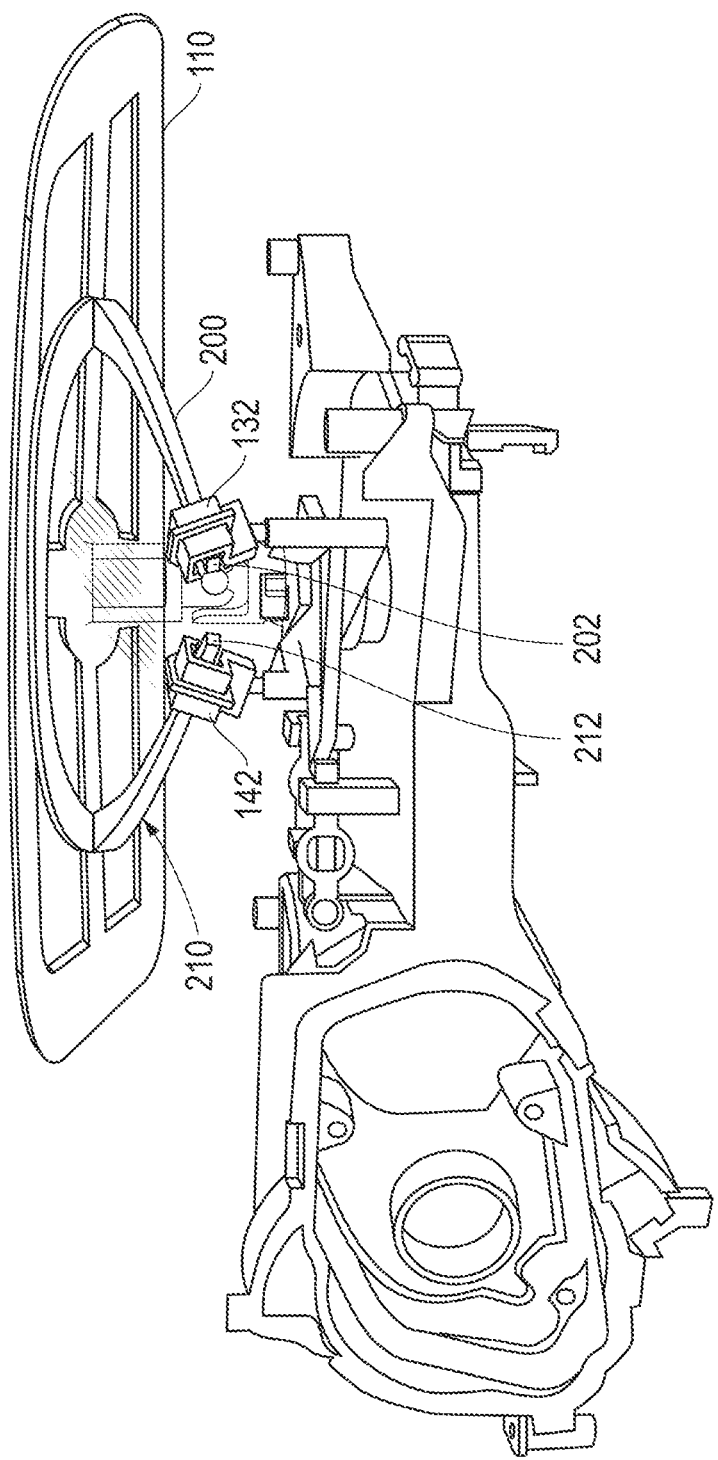
FIG. 9 is a diagram illustrating the rearview element or rearview element mount angled fully upwards.
Figure 10:
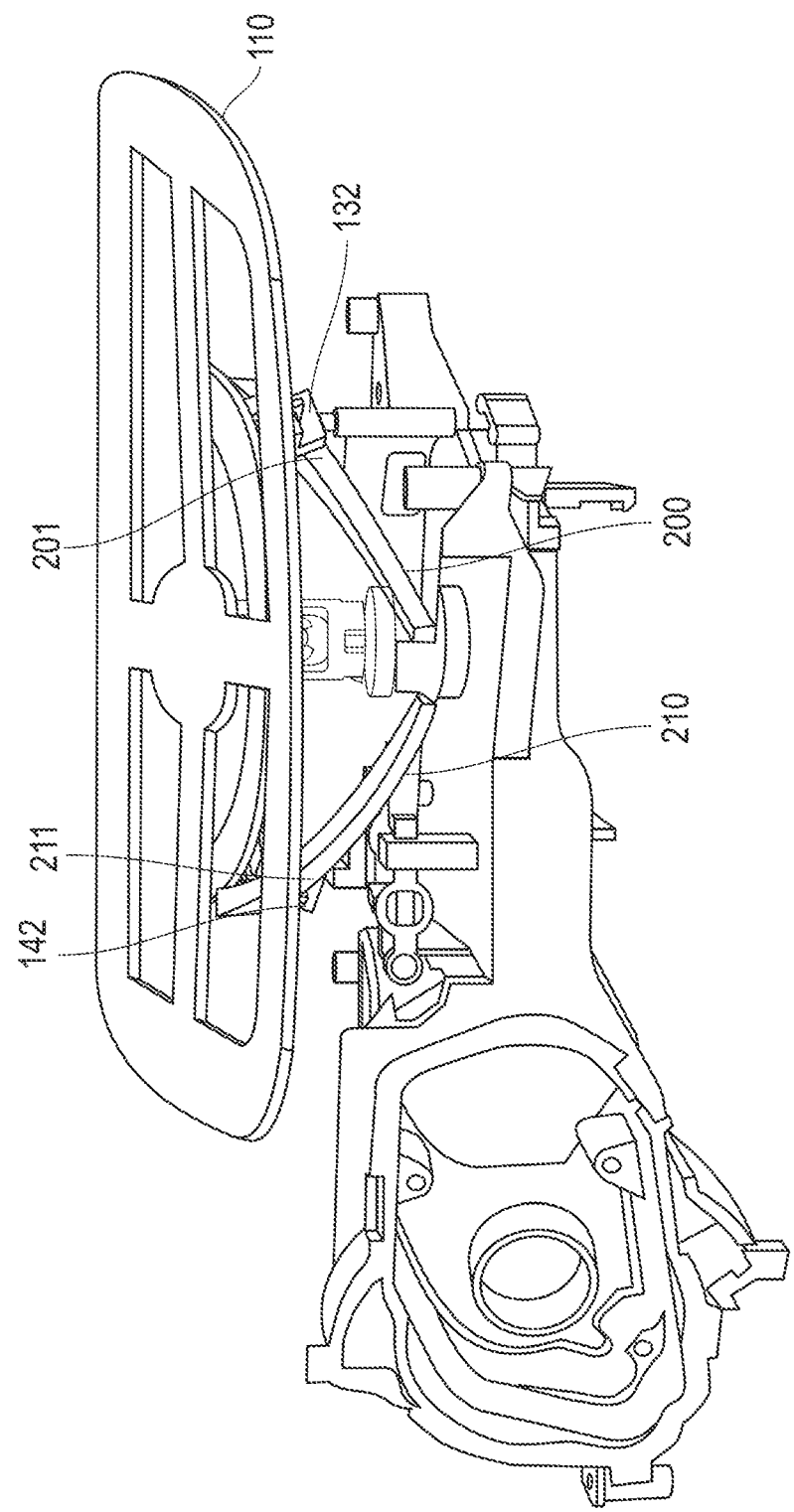
FIG. 10 is a diagram illustrating the rearview element or rearview element mount angled fully downwards.

FIGS. 6-10 are diagrams illustrating different positions of the rearview element or rearview element mount 110 as a result of movement by the actuation mechanism. FIG. 6 is a diagram illustrating the rearview element or rearview element mount 110 in a neutral position. FIG. 7 is a diagram illustrating the rearview element or rearview element mount 110 angled fully away from a user. FIG. 8 is a diagram illustrating the rearview element or rearview element mount 110 angled fully towards the user. FIG. 9 is a diagram illustrating the rearview element or rearview element mount 110 angled fully upwards. FIG. 10 is a diagram illustrating the rearview element or rearview element mount 110 angled fully downwards.

Referring to FIG. 6, with the mirror glass in a neutral position, both contact followers 132, 142 of the cam levers 130, 140 are in the centre position on the cam profiles 200, 210.

Referring to FIG. 7, to angle the rearview element or rearview element mount 110, and consequentially the attached mirror glass (not shown), so that it is angled to the full extent required under specification away from the user on the horizontal axis, the first actuator 135 rotates the first cam lever 130 so that the first contact follower 132 is at the lowest point 201 (within the contact range) on the first cam surface 200. At the same time, the second actuator 145 rotates the second cam lever 140 so that the second contact follower 142 is at the highest point 212 (within the contact range) on the second cam surface 210.

Referring to FIG. 8, to angle the rearview element or rearview element mount 110, and consequentially the attached mirror glass (not shown), so that it is angled to the full extent required under specification towards the user on the horizontal axis, the first actuator 135 rotates the first cam lever 130 so that the first contact follower 132 is at the highest point 202 (within the contact range) on the first cam surface 200. At the same time, the second actuator 145 rotates the second cam lever 140 so that the second contact follower 142 is at the lowest point 211 (within the contact range) on the second cam surface 210.

Referring to FIG. 9, to angle the rearview element or rearview element mount 110, and consequentially the attached mirror glass (not shown), so that it is angled to the full extent required under specification up along the vertical axis, the first actuator 135 rotates the first cam lever 130 so that the first contact follower 132 is at the highest point 202 (within the contact range) on the first cam surface 200. At the same time, the second actuator 145 rotates the second cam lever 140 so that the second contact follower 142 is at the highest point 212 (within the contact range) on the second cam surface 210.

Referring to FIG. 10, to angle the rearview element or rearview element mount 110, and consequentially the attached mirror glass (not shown), so that it is angled to the full extent required under specification down along the vertical axis, the first actuator 135 rotates the first cam lever 130 so that the first contact follower 132 is at the lowest point 201 (within the contact range) on the first cam surface 200. At the same time, the second actuator 145 rotates the second cam lever 140 so that the second contact follower 142 is at the lowest point 211 (within the contact range) on the second cam surface 210.

Figure 11:
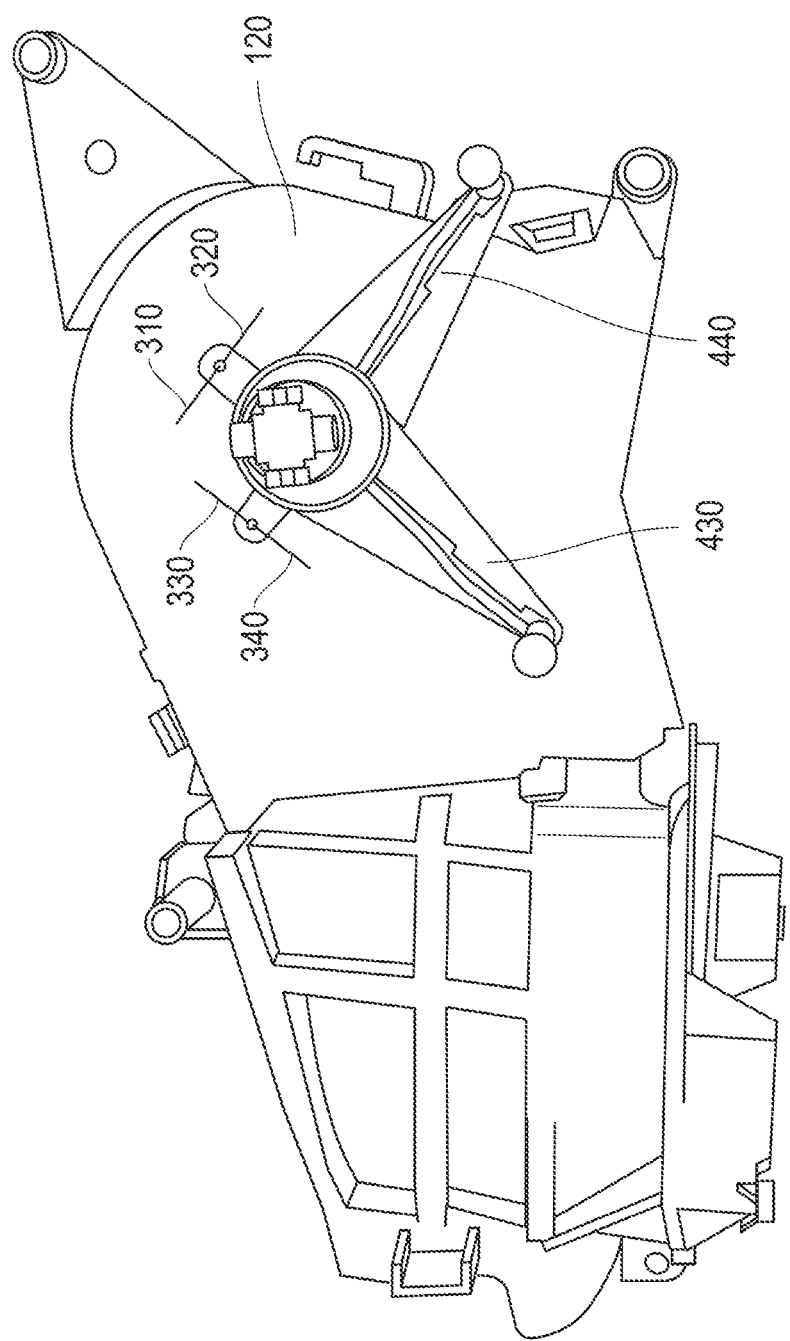
FIG. 11 is a diagram illustrating another example of the actuation mechanism using shape memory alloy springs as actuators.

FIG. 11 is a diagram illustrating another example of the actuation mechanism using shape memory alloy springs 310, 320, 330, 340 as actuators.

Referring to FIG. 11, an example of a shape memory alloy actuation mechanism is illustrated. In this example, proportionally controlled shape memory alloy springs or wires 310, 320, 330, 340 are provided. In this system, the cam levers 130, 140 have been replaced with other cam levers 430, 440 modified for shape memory alloys 310, 320, 330, 340. The modification incorporates an aperture at the end of a short lever, each attached to two shape memory alloy (SMA) springs 310, 320 or 330, 340. The other end of each shape memory alloy spring is fixed to the case frame 120.

The rotation of the first cam lever 430 anti-clockwise may be achieved by activating first SMA spring 310, which allows second SMA spring 320 to expand to allow movement to a new position. To rotate first cam lever 430 clockwise, the second SMA spring 320 is activated and the first SMA spring 310 expands to allow movement to the new position. The rotation of the second cam lever 440 is achieved in a similar manner to the first cam lever 430 using third SMA spring 330 and fourth SMA spring 340.

By rotating the first and second cam levers 430, 440, movement of the rearview element or rearview element mount 110 is achieved in the same operation as described above with the cam levers 130, 140 and the piezo actuators 135, 145 using the cam lever contact followers 132, 142.

Figure 12:
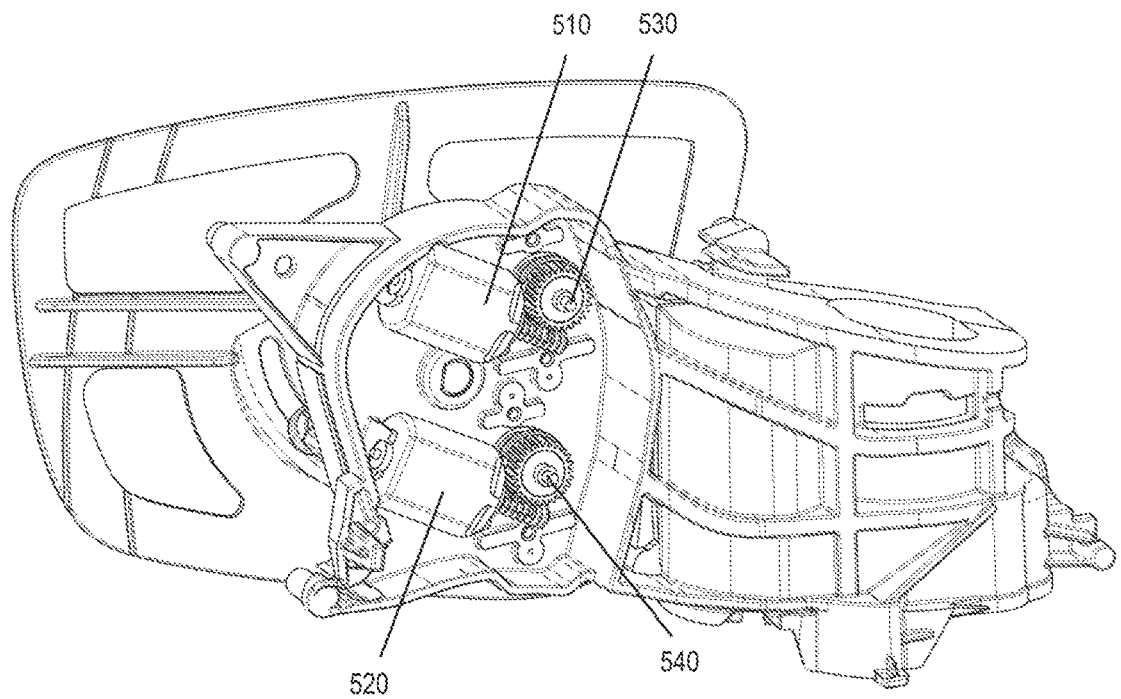
FIG. 12 is a diagram illustrating a bottom view of another example of the actuation mechanism using motors and gears as actuators.
Figure 13:
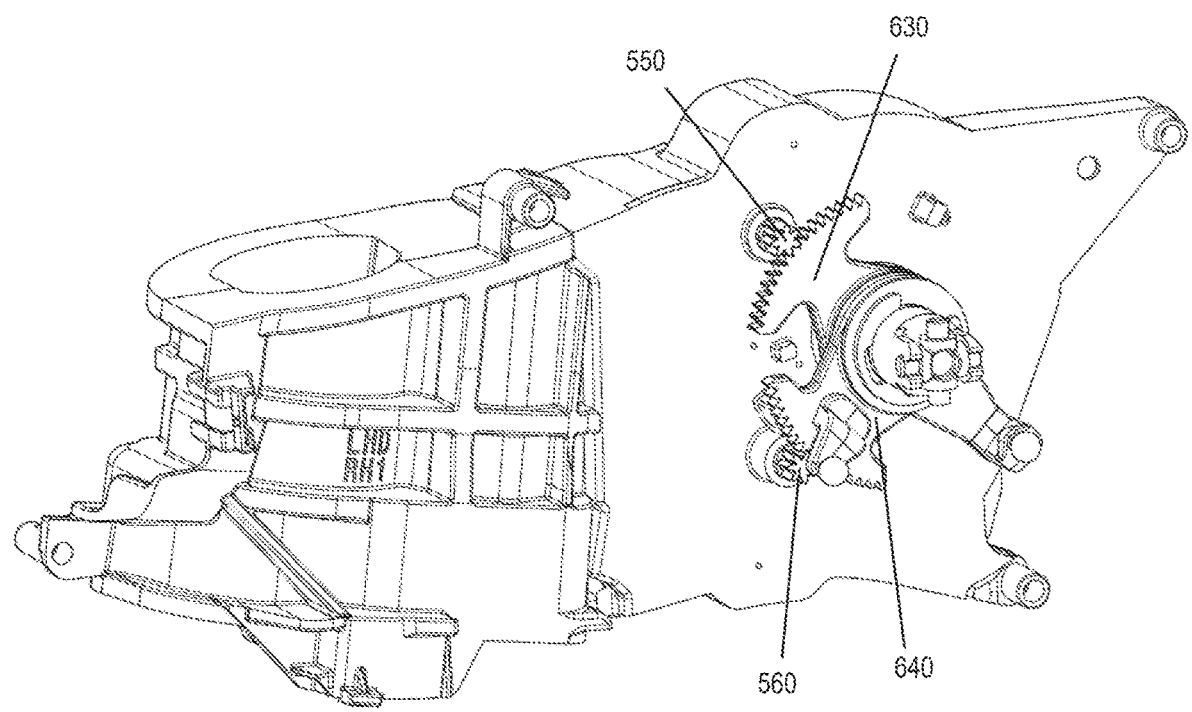
FIG. 13 is a diagram illustrating a top view of the example of the actuation mechanism illustrated in FIG. 12 using motors and gears as actuators.

FIG. 12 is a diagram illustrating a bottom view of another example of the actuation mechanism using motors 510, 520 and gears 530, 540, 550, 560 as actuators, and FIG. 13 is a diagram illustrating a top view of the example of the actuation mechanism illustrated in FIG. 12 using motors 510, 520 and gears 530, 540, 550, 560 as actuators.

Referring to FIGS. 12 and 13, an example of motors 510, 520 and gears 530, 540, 550, 560 actuation mechanisms is illustrated. In this example, first and second motors 510, 520 are provided which respectively rotate the first and second gears 530, 540 which when rotating are also rotating the first and second gear actuators 550, 560 at the opposite end as seen on the top view of FIG. 13. In this system, the cam levers 130, 140 have been replaced with other cam levers 630, 640 modified for first and second gear actuators 550, 560. The modification incorporates corresponding teeth at the end of each lever 630, 640 for interacting with the first and second gear actuators 550, 560.

One of skill in the art will recognize that the embodiments described above are not limited to any particular size and the size of the device parts and will depend upon the particular application and intended components. It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE LIST 100 rearview device
110 rearview element or rearview element mount
120 case frame
130 first cam lever
131 first contact follower receiving portion
132 first contact follower
135 first actuator
140 second cam lever
141 second contact follower receiving portion
142 second contact follower
145 second actuator
150 center pivot
200 first cam surface
201 lowest point on the first cam surface
202 highest point on the first cam surface
210 second cam surface
211 lowest point on the second cam surface
212 highest point on the second cam surface
310 first SMA spring or wire
320 second SMA spring or wire
330 third SMA spring or wire
340 fourth SMA spring or wire
430 first cam lever
440 second cam lever
510 first motor
520 second motor
530 first gear
540 second gear
550 first gear actuator
560 second gear actuator
630 first cam lever
640 second cam lever

What is claimed is:

1. An actuator mechanism for a rearview device, comprising:
    a first cam surface, which is positioned on or is part of a rearview element or a rearview element mount of the rearview device, the first cam surface comprising a first cam surface highest point and a first cam surface lowest point;
    a first cam lever configured to move on the first cam surface;
    a first actuator configured to rotate the first cam lever, wherein rotating the first cam lever in one direction causes the rearview element or the rearview element mount to move in one manner and rotating the first cam lever in an opposite direction causes the rearview element or the rearview element mount to a move in another manner; and wherein one of the first cam surface highest point or the first cam surface lowest point couples directly to or directly abuts the rearview element or rearview element mount.

2. The actuator mechanism of claim 1, further comprising:

a second cam surface which is positioned on or is part of the rearview element or rearview element mount;

a second cam lever configured to move on the second cam surface;

a second actuator configured to rotate the second cam lever, wherein rotating the second cam lever in one direction causes the rearview element or rearview element mount to move in one manner, and rotating the second cam lever in an opposite direction causes the rearview element or rearview element mount to move in another manner.

3. The actuator mechanism of claim 2, wherein at least one of the first cam surface is curved, and the second cam surface is curved and comprises a second cam surface highest point and a second cam surface lowest point.

4. The actuator mechanism of claim 2, wherein at least one of the first cam lever comprises a first contact follower which moves on the first cam surface, and the second cam lever comprises a second contact follower which moves on the second cam surface.

5. The actuator mechanism of claim 4, wherein, in response to the first contact follower being moved to a central position on the first cam surface and the second contact follower being moved to a central position on the second cam surface, the rearview element or rearview element mount is in a neutral position.

6. The actuator mechanism of claim 4, wherein, in response to the first contact follower being moved to the first cam surface lowest point and the second contact follower being moved to the second cam surface highest point, the rearview element or the rearview element mount is angled fully away from a user.

7. The actuator mechanism of claim 4, wherein, in response to the first contact follower being moved to the first cam surface highest point and the second contact follower being moved to the second cam surface lowest point, the rearview element or the rearview element mount is angled fully towards a user.

8. The actuator mechanism of claim 4, wherein, in response to the first contact follower being moved to the first cam surface highest point and the second contact follower being moved to the second cam surface highest point, the rearview element or rearview element mount is angled fully upwards along a vertical axis.

9. The actuator mechanism of claim 4, wherein, in response to the first contact follower being moved to the first cam surface lowest point and the second contact follower being moved to the second cam surface lowest point, the rearview element or rearview element mount is angled fully downwards along a vertical axis.

10. The actuator mechanism of claim 2, wherein at least one of the first actuator comprises at least one of a piezoelectric actuator, one or more shape memory alloy springs or wires, and a motor and gear, and the second actuator comprises at least one of a piezoelectric actuator, one or more shape memory alloy springs or wires, and a motor and gear.

11. An actuator mechanism for a rearview device, the actuator mechanism comprising:

a first cam surface which is positioned on or is part of a rearview element or rearview element mount of the rearview device, a first cam lever configured to move on the first cam surface, and a first actuator configured to rotate the first cam lever, wherein rotating the first cam lever in one direction causes the rearview element or rearview element mount to move in one manner, and rotating the first cam lever in an opposite direction causes the rearview element or rearview element mount to a move in a different manner;

a second cam surface which is positioned on or is part of the rearview element or rearview element mount, and a second cam lever configured to move on the second cam surface; and at least one of:

a second actuator configured to rotate the second cam lever, wherein rotating the second cam lever in one direction causes the rearview element or rearview element mount to move in one manner, and rotating the second cam lever in an opposite direction causes the rearview element or rearview element mount to move in a different manner; or a first contact follower which is comprised by the first cam lever and moves on the first cam surface, or a second contact follower which is comprised by the second cam lever and moves on a second cam surface, wherein at least one of:

the first contact follower is moved to a central position on the first cam surface and the second contact follower is moved to a central position on the second cam surface, the rearview element or rearview element mount is in a neutral position, the first contact follower is moved to the first cam surface lowest point and the second contact follower is moved to the second cam surface highest point, the rearview element or rearview element mount is angled fully away from a user, the first contact follower is moved to the first cam surface highest point and the second contact follower is moved to the second cam surface lowest point, the rearview element or rearview element mount is angled fully towards a user, the first contact follower is moved to the first cam surface highest point and the second contact follower moved to the second cam surface highest point, the rearview element or rearview element mount is angled fully upwards along a vertical axis, or the first contact follower is moved to the first cam surface lowest point and the second contact follower is moved to the second cam surface lowest point, the rearview element or rearview element mount is angled fully downwards along a vertical axis.

* * * * *